(12) United States Patent
Arai

(10) Patent No.: US 11,226,814 B2
(45) Date of Patent: Jan. 18, 2022

(54) COMPILER DEVICE AND COMPILING METHOD

(71) Applicant: OMRON Corporation, Kyoto (JP)

(72) Inventor: Wataru Arai, Otsu (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 17/251,182

(22) PCT Filed: Jun. 18, 2019

(86) PCT No.: PCT/JP2019/023996
§ 371 (c)(1),
(2) Date: Dec. 10, 2020

(87) PCT Pub. No.: WO2020/008855
PCT Pub. Date: Jan. 9, 2020

(65) Prior Publication Data
US 2021/0216309 A1 Jul. 15, 2021

(30) Foreign Application Priority Data
Jul. 3, 2018 (JP) .............................. JP2018-126935

(51) Int. Cl.
*G06F 8/72* (2018.01)
*G06N 20/00* (2019.01)
(Continued)

(52) U.S. Cl.
CPC ................. *G06F 8/72* (2013.01); *G06F 8/51* (2013.01); *G06F 9/3897* (2013.01); *G06F 9/44505* (2013.01); *G06N 20/00* (2019.01)

(58) Field of Classification Search
CPC . G06F 8/72; G06F 8/51; G06F 9/3897; G06F 9/44505; G06N 20/00
See application file for complete search history.

(56) References Cited

U.S. PATENT DOCUMENTS

| 2005/0039159 A1* | 2/2005 | Pan ...................... G06F 8/314 717/100 |
| 2005/0149903 A1* | 7/2005 | Archambault ........ G06F 9/5016 717/100 |

(Continued)

FOREIGN PATENT DOCUMENTS

| JP | H04260134 | 9/1992 |
| JP | H11272475 | 10/1999 |

(Continued)

OTHER PUBLICATIONS

"International Search Report (Form PCT/ISA/210)" of PCT/JP2019/023996, dated Aug. 13, 2019, with English translation thereof, pp. 1-4.

(Continued)

*Primary Examiner* — Phillip H Nguyen
(74) *Attorney, Agent, or Firm* — JCIPRNET

(57) ABSTRACT

The objective of the present invention is to prevent a conflict between variable names and unintended overwriting of data when a plurality of programs that define shared variables exist. A compiler device (12) includes: an identifier acquisition part (121*a*) for acquiring an identifier of a first user program; a shared variable name generation part (121*b*) for generating a shared variable name that includes a variable name of a shared variable and the identifier; a conversion part (121*c*) for converting the first user program to machine language; and an address determination part (122*a*) for determining an address of the shared variable. The address determination part (122*a*) associates the shared variable name and the address of the shared variable with each other and embeds these in the first user program that has been converted to machine language.

10 Claims, 5 Drawing Sheets

(51) Int. Cl.
*G06F 8/51* (2018.01)
*G06F 9/38* (2018.01)
*G06F 9/445* (2018.01)

(56) References Cited

U.S. PATENT DOCUMENTS

| | | | | |
|---|---|---|---|---|
| 2005/0283780 | A1* | 12/2005 | Karp | G06F 9/383 |
| | | | | 718/100 |
| 2005/0283781 | A1* | 12/2005 | Karp | G06F 11/3624 |
| | | | | 718/100 |
| 2006/0095897 | A1* | 5/2006 | Kawai | G06F 8/433 |
| | | | | 717/140 |
| 2011/0197174 | A1* | 8/2011 | Wu | G06F 8/53 |
| | | | | 717/104 |
| 2012/0233410 | A1* | 9/2012 | Fu | G06F 12/0837 |
| | | | | 711/141 |
| 2014/0156939 | A1* | 6/2014 | Chung | G06F 11/3624 |
| | | | | 711/130 |

FOREIGN PATENT DOCUMENTS

| | | |
|---|---|---|
| JP | 2000132208 | 5/2000 |
| JP | 2001109632 | 4/2001 |
| JP | 2001282864 | 10/2001 |
| JP | 2006099639 | 4/2006 |
| JP | 2006244488 | 9/2006 |
| WO | 2018198439 | 11/2018 |

OTHER PUBLICATIONS

"Written Opinion of the International Searching Authority (Form PCT/ISA/237)" of PCT/JP2019/023996, dated Aug. 13, 2019, with English translation thereof, pp. 1-10.

* cited by examiner

FIG. 3

Shared variable symbol table — 23b

| Shared variable name | Address |
|---|---|
| Press.status | 0X00000000 |
| Cutter.status | 0X00000001 |
| ⋮ | ⋮ |

COMPILER DEVICE AND COMPILING METHOD

CROSS-REFERENCE TO RELATED APPLICATION

This application is a 371 application of the International PCT application serial no. PCT/JP2019/023996, filed on Jun. 18, 2019, which claims the priority benefits of Japan Patent Application No. 2018-126935, filed on Jul. 3, 2018. The entirety of each of the above-mentioned patent applications is hereby incorporated by reference herein and made a part of this specification.

BACKGROUND

Technical Field

The disclosure relates to a compiler device and a compiling method for preventing unintentional overwriting of data shared between user programs.

Description of Related Art

Conventionally, the following control controlling device is known (see Patent Document 1 (Japanese Patent Application Laid-Open No. 2000-132208)). That is, when there are a plurality of user programs, data are exchanged between them via a data storage part. When data exchange is performed between the programs, a variable name is given to the data, and each user program writes or reads the data from the data storage part using the variable name as a key.

Also, conventionally, a platform for data services between application frameworks different from each other is known (see Patent Document 2 (Japanese Patent Application Laid-Open No. 2006-244488)).

In addition, conventionally, a name mark management method of a language management system for managing name marks in input/output specification description in a language processing system which processes specification description or language description or in an input source program/output object program is known (see Patent Document 3 (Japanese Patent Publication No. Hei 4-260134)).

SUMMARY

However, none of the above techniques is a technique for preventing a conflict between variable names and unintentional overwriting of data when there are a plurality of programs.

One aspect of the disclosure is to prevent a conflict between variable names and unintentional overwriting of data when there are a plurality of programs which define a shared variable.

To solve the above problem, one aspect of the disclosure provides a compiler device. A shared variable referenceable from both a first user program and a second user program is defined in a source code of the first user program. The compiler device includes an identifier acquisition part, a shared variable name generation part, a conversion part, and an address determination part. The identifier acquisition part acquires an identifier of the first user program. The shared variable name generation part generates a shared variable name including the identifier and a variable name of the shared variable in the source code of the first user program. The conversion part converts the first user program into machine language. The address determination part determines an address of the shared variable. The address determination part associates the shared variable name and the address of the shared variable with each other and embeds them in the first user program which has been converted into machine language.

To solve the above problem, one aspect of the disclosure provides a compiling method. A shared variable referenceable from both a first user program and a second user program is defined in a source code of the first user program. The compiling method includes the following steps. An identifier of the first user program is acquired. A shared variable name including the identifier and a variable name of the shared variable in the source code of the first user program is generated. The first user program is converted into machine language. An address of the shared variable is determined. The shared variable name and the address of the shared variable are associated with each other and embedded in the first user program which has been converted into machine language.

To solve the above problem, one aspect of the disclosure provides a compiler device including a determination part, a conversion part, and an address determination part. The determination part determines whether a variable referenced in a source code of a second user program is a shared variable. The conversion part converts the second user program into machine language. In a case where the variable is not a shared variable, the address determination part replaces an instruction to access the variable with a machine language instruction to access an address of the variable without using an API (application program interface). In a case where the variable is a shared variable, the conversion part replaces an instruction to access the variable with a machine language instruction to access the variable via an API provided by a program management part which knows an address of the shared variable.

To solve the above problem, one aspect of the disclosure provides a compiling method including a determination process of determining whether a variable referenced in a source code of a second user program is a shared variable, and a conversion process of converting the second user program into machine language. In the conversion process, in a case where the variable is not a shared variable, an instruction to access the variable is replaced with a machine language instruction to access an address of the variable without using an API (application program interface), and in a case where the variable is a shared variable, an instruction to access the variable is replaced with a machine language instruction to access the variable via an API provided by a program management part which knows an address of the shared variable.

According to one aspect of the disclosure, it is possible to prevent a conflict between variable names and unintentional overwriting of data when there are a plurality of programs which define a shared variable.

BRIEF DESCRIPTION OF THE DRAWINGS

FIG. 3 is a view showing details of a shared variable symbol table.

DESCRIPTION OF THE EMBODIMENTS

§ 1 Application Example

Figure 1:
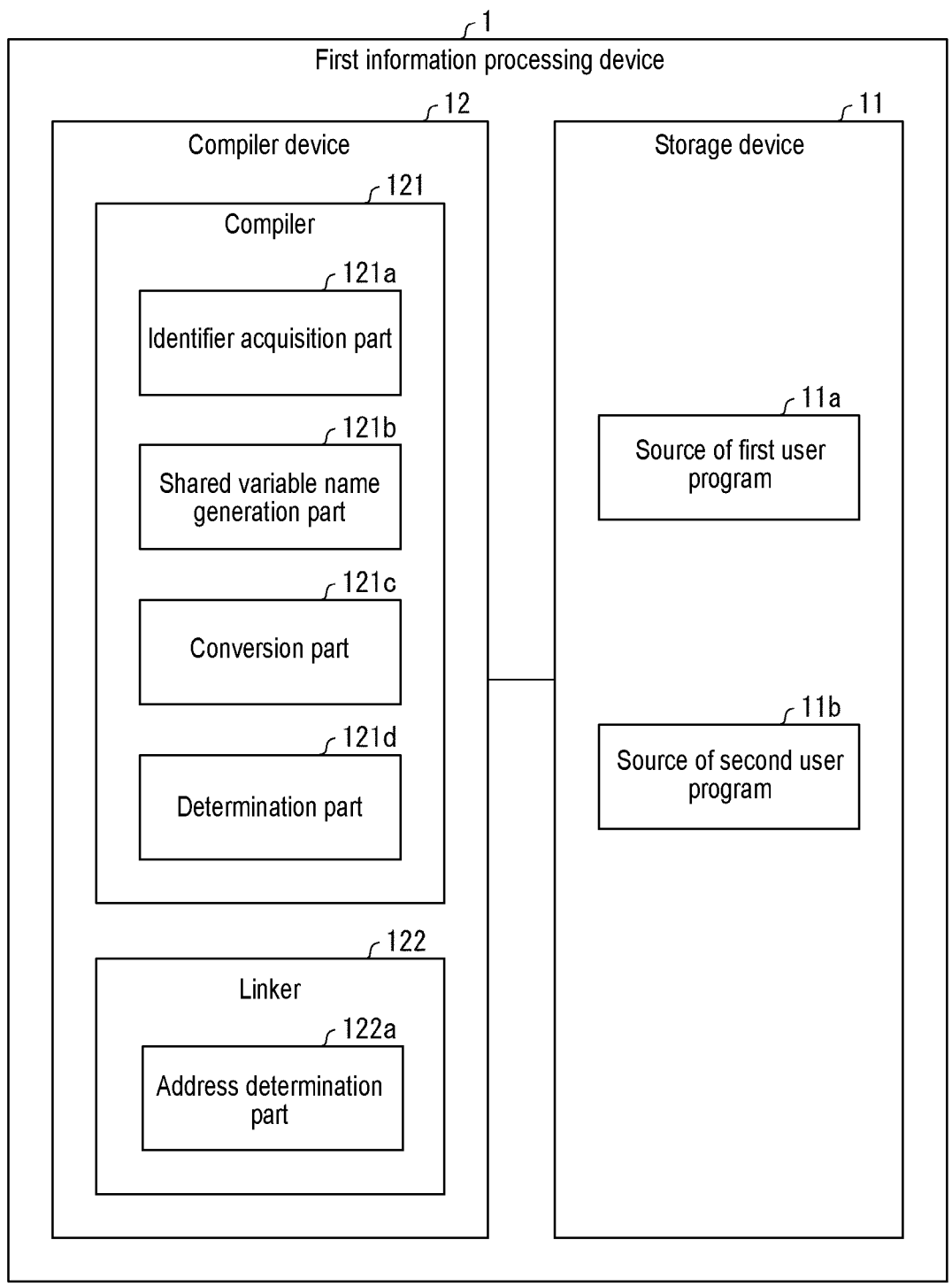
FIG. 1 is a block diagram schematically showing an example of the configuration of a first information processing device provided with a compiler device according to an embodiment.

An example of an application scene of a compiler device according to this embodiment will be described with reference to FIG. 1. FIG. 1 is a block diagram schematically showing an example of the configuration of a first information processing device 1 provided with a compiler device 12 according to this embodiment. The compiler device 12 according to this embodiment is a device for preventing a conflict between variable names and unintentional overwriting of data when there are a plurality of user programs which define a shared variable.

The compiler device 12 generates a shared variable name including an identifier and a variable name of a shared variable included in the source code of a first user program. The identifier is an identifier which makes a plurality of user programs distinguishable from each other. The compiler device 12 associates the shared variable name and an address of the shared variable with each other and embeds them in the first user program which has been converted into machine language. In the source code of a plurality of user programs, even if the same variable name is unintentionally assigned to a plurality of shared variables, a second user program which accesses a shared variable can distinguish each shared variable by the shared variable name which includes the identifier.

§ 2 Configuration Example (Configuration of First Information Processing Device)

As shown in FIG. 1, the first information processing device 1 includes a storage device 11 and a compiler device 12. The storage device 11 stores a source 11a of a first user program (hereinafter referred to as a program A) and a source 11b of a second user program (hereinafter referred to as a program B). The compiler device 12 includes a compiler 121 and a linker 122. The compiler 121 includes an identifier acquisition part 121a, a shared variable name generation part 121b, a conversion part 121c, and a determination part 121d. The linker 122 includes an address determination part 122a.

The source 11a of the program A defines a shared variable therein. In other words, the source 11a of the program A describes an instruction to generate a shared variable and write a value to the shared variable. The source 11b of the program B references the shared variable therein. In other words, the source 11b of the program B describes an instruction to read the shared variable.

Further, the storage device 11 is, for example, a non-volatile memory, a hard disk, or the like, but is not limited thereto. By providing the storage device 11, data loss can be reliably prevented.

The compiler device 12 compiles and links the source 11a (e.g., a text file in which the program code is written by the user) of the program A of the storage device 11. When compiled and linked, the source 11a of the program A becomes an executable program. In addition, in this specification, compiling and linking processes may be collectively referred to as "compiling".

Specifically, a shared variable which may be referenced from both the program A and the program B is defined in the source code of the program A. The identifier acquisition part 121a acquires an identifier of the program A. The determination part 121d determines whether a variable described in the source code of the program A is a shared variable or a non-shared variable. For example, in the source code, by making a predetermined declaration, whether a variable is a shared variable or a non-shared variable may be defined. The shared variable name generation part 121b generates a shared variable name including the identifier and a variable name of the shared variable in the source code of the program A. The conversion part 121c converts the source code of the program A into machine language. For example, the compiler 121 generates a plurality of object codes from the source code of the program A. The object code includes a machine language code, relocation information, and the like. The shared variable name generation part 121b replaces the variable name of the shared variable with the generated shared variable name. In the object code, an access instruction to the shared variable is described by a symbolic reference (reference using the shared variable name).

The linker 122 is also referred to as a linkage editor. The linker 122 combines a plurality of object codes converted by the compiler 121. The address determination part 122a determines the address of the shared variable. The address determination part 122a replaces the access (write/reference) instruction to the shared variable using the symbolic reference in the object code, with an access instruction to the shared variable using the address. In other words, the address determination part 122a replaces the instruction to access the shared variable in the program A which has been converted into machine language, with an instruction to access the address of the shared variable. Further, the address determination part 122a associates the shared variable name and the address of the shared variable with each other and embeds them in the program A which has been converted into machine language. For example, the shared variable name and the address are embedded in the program A as a symbol table.

The program A in machine language (converted into an executable format) is stored in the storage device 11. The first information processing device 1 transmits the program A in machine language to the second information processing device 2.

(Configuration of Second Information Processing Device)

Figure 2:
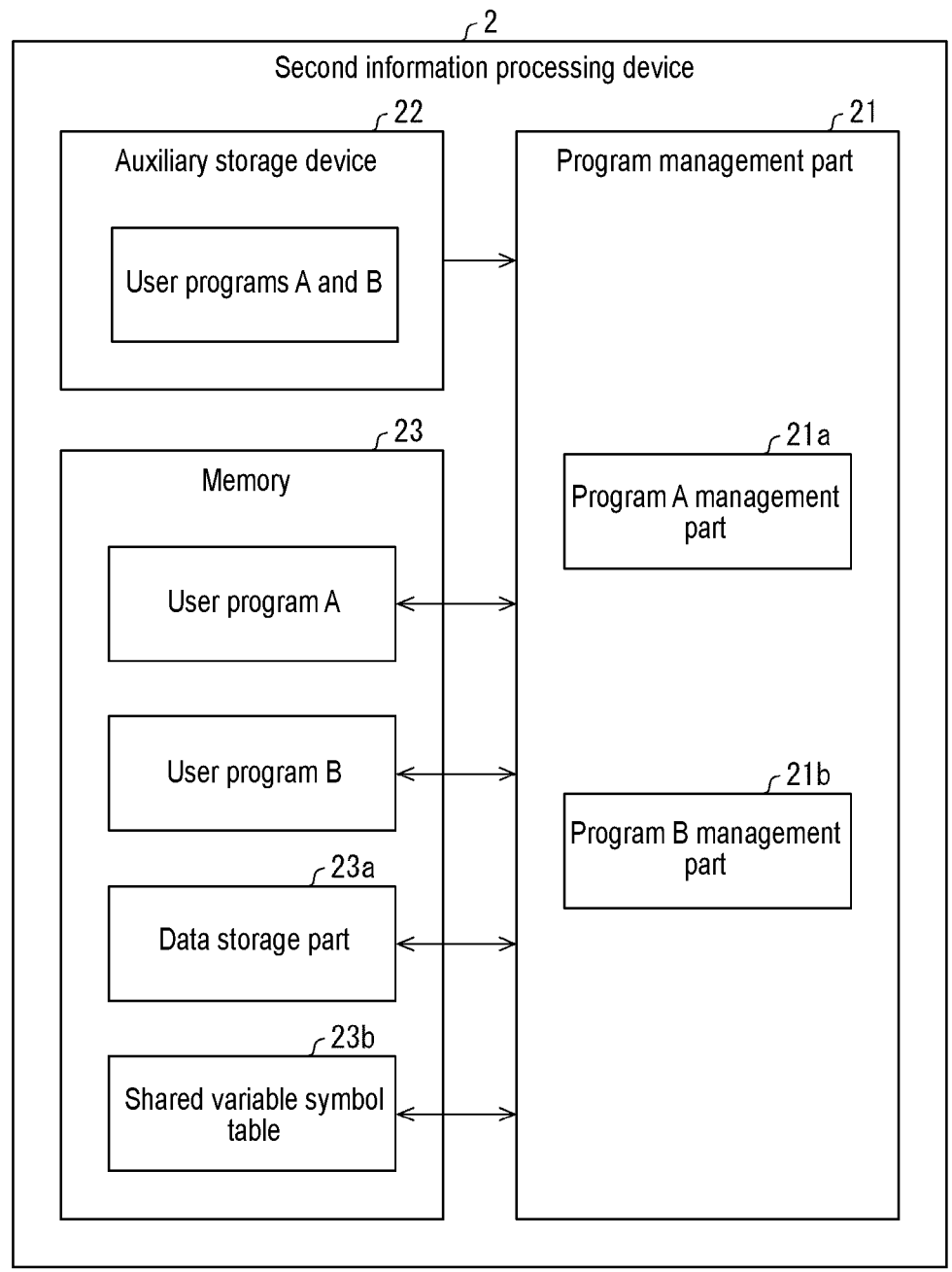
FIG. 2 is a block diagram schematically showing an example of the configuration of a second information processing device according to an embodiment.

FIG. 2 is a block diagram schematically showing an example of the configuration of the second information processing device 2 according to this embodiment. The second information processing device 2 may be a control device such as a PLC (programmable logic controller) which controls the operation of various devices. The second information processing device 2 includes a program management part 21, an auxiliary storage device 22, and a memory 23.

The program management part 21 includes a program A management part 21a and a program B management part 21b. The program A management part 21a executes the program A in machine language. The program B management part 21b executes the program B in machine language.

The auxiliary storage device 22 stores the program A and the program B received from the first information processing device 1. The memory 23 temporarily stores the program A and the program B. The auxiliary storage device 22 is, for example, a non-volatile memory, a hard disk, or the like, but is not limited thereto.

The memory 23 temporarily stores the program A and the program B. The memory 23 is, for example, a volatile memory or the like, but is not limited thereto. The memory 23 includes a data storage part 23a and a shared variable symbol table 23b. The data storage part 23a stores data of shared variables which may be referenced from both the program A and the program B.

The "shared variable" as used herein refers to a variable which may be referenced from a plurality of user programs. The shared variable symbol table 23b stores the storage locations (address) of the shared variables stored in the data storage part 23a.

(Execution of Program A)

FIG. 3 is a view showing details of the shared variable symbol table 23b. Upon receiving an instruction from the user to execute the program A, the program A management part 21a loads the program A from the auxiliary storage device 22 and stores the program A in the memory 23. The program A stored in the auxiliary storage device 22 is a program which has converted (compiled and linked) into machine language. The program A which has been converted into machine language includes a symbol table showing the correspondence between the shared variable names and the addresses of the shared variables. A non-shared variable is a variable which is used only within the program A and can only be referenced by the program A. In the compiled program A, the address of the non-shared variable is specified. In the compiled program A, the information of the variable name of the non-shared variable does not have to remain. However, the program A includes the information of the shared variable name and the information of the address of the shared variable even after being compiled.

The program A management part 21a acquires the information of the shared variable name and the information of the corresponding address. The program A management part 21a associates the shared variable name and the address of the shared variable with each other and records them in the shared variable symbol table 23b. Further, the program A management part 21a writes the data of the shared variable to the address of the data storage part 23a.

(Identifier)

The identifier of a user program is a character string or a numerical value unique to the user program. The identifiers of a plurality of user programs are set so that they do not repeat each other. For example, the program name of the user program, the path of the directory where the user program is configured, a character string arbitrarily set by the user, a UUID (universally unique identifier), or a domain name may be the identifier of the user program.

In the example of FIG. 3, the identifier of the program A is "Press". The variable name "status" is a variable name of a shared variable defined in the source code of the program A. The shared variable name generation part 121b combines the identifier "Press" with the original variable name "status" to generate a shared variable name "Press.status" of the shared variable. The shared variable name "Press.status" is a variable name used as a key when the shared variable is referenced from another program B. Herein, "." is added between the identifier and the variable name, but any character or character string may be used instead. Also, there may be no character between the identifier and the variable name. The order of the identifier and the variable name is also arbitrary. For example, "Cutter.status" shown in FIG. 3 is a shared variable name of a shared variable defined in the program B. The identifier of the program B is "Cutter". The variable name of the shared variable defined in the program B is "status". The shared variable name generation part 121b generates a shared variable name including an identifier and a variable name according to a predetermined rule. Therefore, even if a plurality of shared variables having the same variable name "status" are defined in a plurality of user programs, it is possible to avoid a conflict between shared variable names. While the shared variable names are, for example, Press.status and Cutter.status and the addresses corresponding to these shared variable names are, as an example, respectively 0X00000000 and 0X00000001, this embodiment is not limited thereto.

(Compiling and Linking of Program B)

The program B references (reads) the shared variable defined (generated) by the program A. The compiler device 12 of the first information processing device 1 performs compiling and linking of the source 11b of the program B.

Specifically, in the source code of the program B, an instruction to reference a shared variable defined in another program A is described. It is assumed that the user knows the shared variable name "Press.status" of the shared variable to be referenced. For example, when creating the program B, the user describes the source code using the shared variable name "Press.status" as the variable name of the shared variable.

The determination part 121d determines whether a variable described in the source code of the program B is a shared variable or a non-shared variable. Further, the determination part 121d determines whether a shared variable described in the source code of the program B is a shared variable generated (defined) in the program B or a shared variable generated (defined) in another program. For example, in the source code, by making a predetermined declaration, it may be defined whether a variable is a shared variable generated by its own program, a shared variable generated by another program, or a non-shared variable. In addition, for example, when the variable name of a variable includes a predetermined identifier (the identifier of another program), the determination part 121d may determine that the variable is a shared variable generated in another program.

The conversion part 121c converts the source code of the program B into machine language. If the variable is a shared variable generated by its own program, the method of compiling and linking is as described for the program A.

The case where the variable is a shared variable generated by another program (e.g., the program A) will be described. If the variable is a shared variable generated by another program (e.g., the program A), the conversion part 121c replaces the instruction to access (reference) the shared variable in the source code of the program B with a machine language instruction to access the shared variable via an API (application program interface) This API is an API provided by the program management part 21 which knows the address of the shared variable. The program management part 21 may acquire the address of the shared variable from the shared variable symbol table 23b using the shared variable name as a key.

For example, the program management part 21 (the program A management part 21a and the program B management part 21b) provides a first API which returns a value (data) of a shared variable using a shared variable name as a key, or a second API which returns an address of a shared variable using a shared variable name as a key and a third API which returns a value of a variable (shared variable) using an address as a key. The conversion part 121c may replace the instruction to access (reference) the shared variable in the source code of the program B with a machine language instruction to reference the shared variable via the first API. The conversion part 121c may also replace the instruction to access (reference) the shared variable in the source code of the program B with a machine language instruction to acquire the address via the second API and a machine language instruction to reference the shared variable via the third API.

The linker 122 combines a plurality of object codes converted by the compiler 121. No address is determined for a shared variable generated by another program. If the variable is a non-shared variable (if it is not a shared variable), the address determination part 122a replaces the instruction to access the variable (using a symbolic reference) in the program B which has been converted into machine language, with a machine language instruction to access an address of the variable without using the API.

The program B in machine language (converted into an executable format) is stored in the storage device 11. The first information processing device 1 transmits the program B in machine language to the second information processing device 2. The program A and the program B may also be compiled and linked in information processing devices different from each other.

(Execution of Program B)

In the second information processing device 2, the program A is executed earlier, and the shared variable name and the address of the shared variable defined in the program A are recorded in the shared variable symbol table 23b. Upon receiving an instruction from the user to execute the program B, the program B management part 21b loads the program B from the auxiliary storage device 22 and stores the program B in the memory 23. The program B stored in the auxiliary storage device 22 is a program which has been converted (compiled and linked) into machine language. The program B which has been converted into machine language includes an instruction to call an API (the first API, the second API, or the third API) which references the shared variable using the shared variable name as a key. In the compiled program B, the address of the non-shared variable is specified. In the compiled program B, the information of the variable name of the non-shared variable does not have to remain. However, the program B includes the information of the shared variable name of the shared variable even after being compiled.

The program B passes the shared variable name "Press.status" of the shared variable as a key to the program B management part 21b via the API function. The program B management part 21b acquires the address corresponding to the shared variable name from the shared variable symbol table 23b. The program B management part 21b acquires data of the shared variable from the data storage part 23a using the address as a key. The program B management part 21b returns the data of the shared variable to the program B. Accordingly, the program B management part 21b can know the address of the shared variable by referencing the shared variable symbol table 23b.

Generally, the compiler type user program has been converted into machine language. Therefore, a variable name specified in the source file is converted into an address and does not remain. According to the above aspect, by using the API which references the shared variable, the shared variable name in the compiled and linked program B remains as a key.

The program A and the program B may be configured in programming languages different from each other. According to the above aspect, variables can be shared between the program A and the program B which are configured in programming languages different from each other. For example, the program A and the program B may also be configured in the same programming language.

Herein, while the program A or the program B includes a program using a ladder language, a C language, or the like, this embodiment is not limited thereto. The ladder language is a programming language suitable for the case where the second information processing device 2 controls the operation of a machine tool, a production device, or the like. For example, in the case of a C language, the source is a text file. For example, in the case of a ladder language, the source may be a text file or a binary file representing a ladder diagram.

According to the compiler device 12 according to this embodiment, it is possible to prevent a conflict between variable names and unintentional overwriting of data when there are a plurality of programs which define a shared variable.

It is noted that, not only in the program B, but in the program A which defines a shared variable, the compiler device 12 may also replace the instruction to access the shared variable with a machine language instruction to access the shared variable via the API. In that case, if the shared variable name is not recorded in the shared variable symbol table 23b, the program A management part 21a which executes the program A determines the address to be assigned to the shared variable. The program A management part 21a associates the determined address and the shared variable name with each other and records them in the shared variable symbol table 23b.

(Configuration Example 1 of Identifier)

Hereinafter, a configuration example 1 of the identifier according to an embodiment 1 will be described. The configuration example 1 of the identifier may be, for example, an argument specified by the user at the time of execution of compiling. Then, the identifier acquisition part 121a uses this argument as the identifier.

(Configuration Example 2 of Identifier)

Hereinafter, another configuration example of the identifier according to the embodiment 1 will be described. The identifier is not limited to the above argument. For example, the identifier may include a path where the program A is to be configured. When the user creates the program A, the path of the directory where the program A is to be configured is specified in the program A. Alternatively, the program A itself may acquire the path of the program A. It is possible that the first information processing device 1 and the second information processing device 2 are not separated and may be the same information processing device.

(Configuration Example 3 of Identifier)

Hereinafter, still another configuration example of the identifier according to the embodiment 1 will be described. The identifier is not limited to the argument and the path. For example, the identifier may include the file name of the program A. Like the path, the file name may be specified in the program A, or the program A itself may acquire the file name of the program A.

(Acquisition Example 1 of Identifier)

Hereinafter, an acquisition example of the identifier according to the embodiment 1 will be described. As described above, the identifier acquisition part 121a acquires the identifier of the program A. Specifically, the identifier acquisition part 121a acquires the identifier from a configuration file. A configuration file which defines the identifier of the program A is stored in a predetermined directory.

(Acquisition Example 2 of Identifier)

Hereinafter, another acquisition example of the identifier according to the embodiment 1 will be described. The acquisition destination of the identifier is not limited to the configuration file. For example, the identifier acquisition part 121*a* may acquire the identifier from the source code of the program A. In that case, in the source code, shared variables which may be referenced from both the program A and the program B are defined.

(Configuration of Shared Variable Name Generation Part)

As described above, the shared variable name generation part 121*b* generates a shared variable name including the identifier and the variable name of the shared variable in the source code of the program A. The shared variable name may be, for example, Press.status, Cutter.status, etc.

(Configuration of Conversion Part)

As described above, the conversion part 121*c* converts the programs A and B into machine language. Specifically, the conversion part 121*c* replaces the instruction to access the shared variable in the source code of the program A with a machine language instruction to access the address of the shared variable.

The conversion part 121*c* replaces the instruction to access the shared variable with a machine language instruction to access the shared variable via an API provided by the program management part which knows the address of the shared variable.

(Compiling Method)

Figure 4:
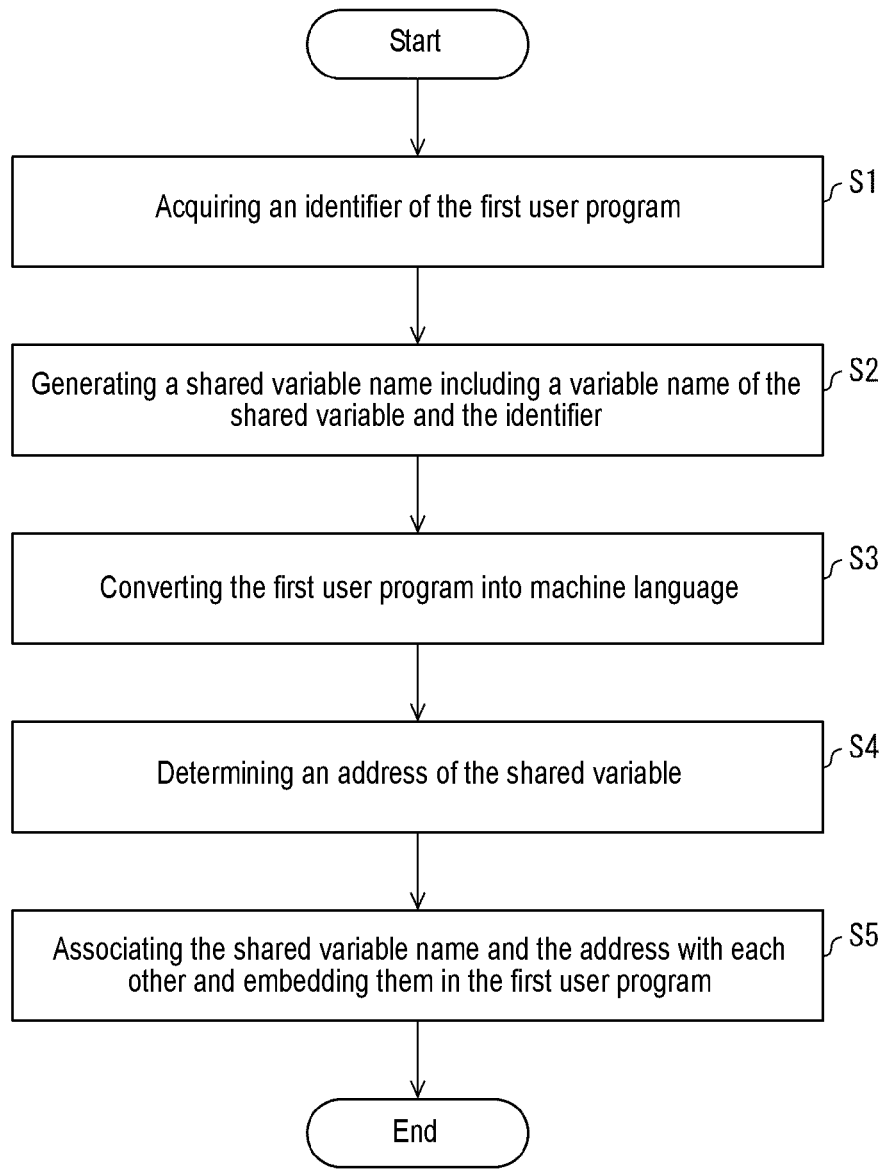
FIG. 4 is a view showing an example of a flowchart of a process in which a compiler device according to an embodiment executes compiling and linking of a program.

FIG. 4 is a flowchart of a process in which the compiler device 12 according to this embodiment executes compiling and linking of the program A. In step S1, the identifier acquisition part 121*a* acquires an identifier of the program A (first user program). Next, in step S2, the shared variable name generation part 121*b* generates a shared variable name including the identifier and a variable name of the shared variable in the source code of the program A. Subsequently, in step S3, the conversion part 121*c* converts the program A into machine language. Afterwards, in step S4, the address determination part 122*a* determines an address of the shared variable. Finally, in step S5, the address determination part 122*a* associates the shared variable name and the address of the shared variable with each other and embeds them in the program A which has been converted into machine language.

Figure 5:
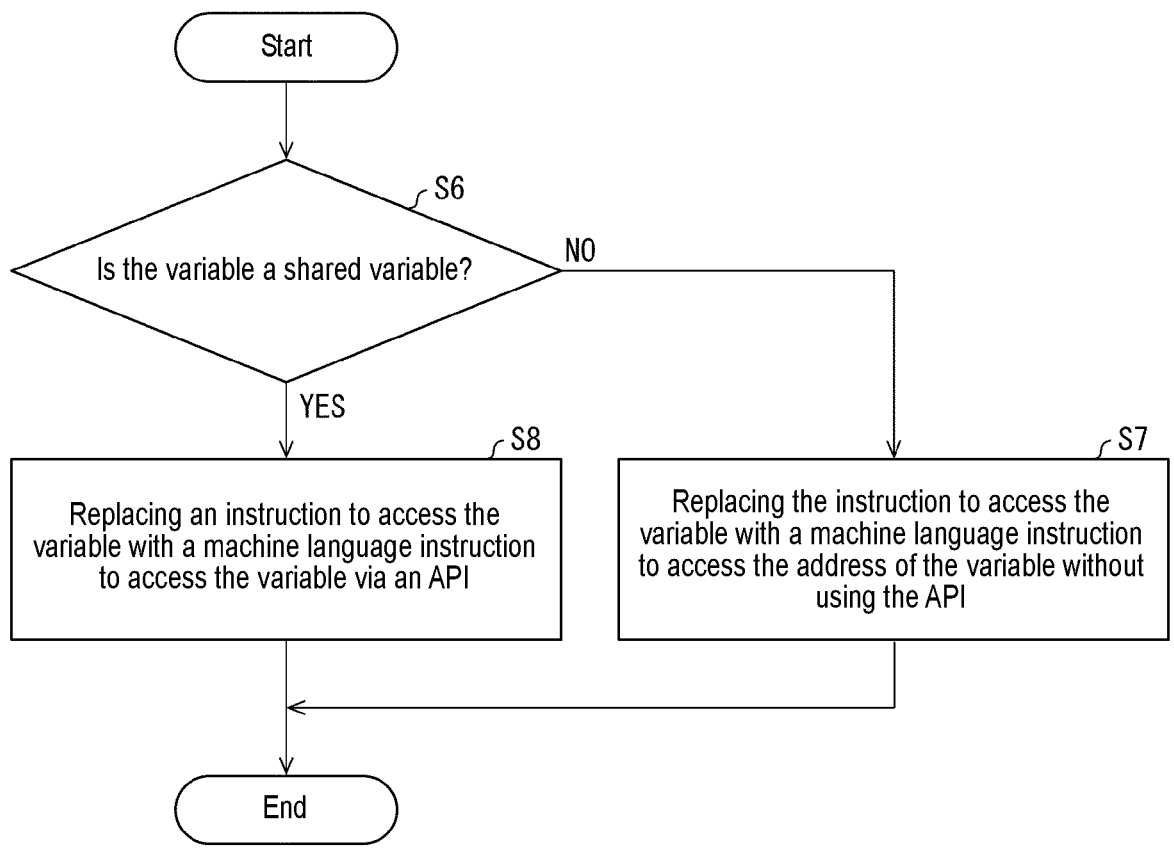
FIG. 5 is a view showing an example of a flowchart of a process in which a compiler device according to an embodiment executes compiling and linking of a program.

FIG. 5 is a flowchart of a process in which the compiler device 12 according to this embodiment executes compiling and linking of the program B. In step S6, the determination part 121*d* determines whether a variable referenced in the source code of the program B is a shared variable. The conversion part 121*c* converts the program B into machine language. At this time, if the variable is a shared variable (Yes in S6), an instruction to access the variable is replaced with a machine language instruction to access the variable via an API provided by the program management part which knows an address of the shared variable (S8). If the variable is not a shared variable (No in S6), at the linking stage, the address determination part 122*a* replaces the instruction to access the variable with a machine language instruction to access an address of the variable without using the API (S7). Herein, the compiling and linking processes are collectively referred to as a conversion process.

According to the above aspect, even if the program B and the first information processing device 1 do not know the address of the shared variable generated by the another program A, the compiler device 12 can compile and link the program B so that the program B can access the shared variable.

Accordingly, the conversion part 121*c* replaces the access (write/reference) instruction to the shared variable in the source 11*b* of the program B with an instruction using the API. In the program B which has been converted into machine language, the address of the shared variable is not determined.

The address of the non-shared variable is determined by the address determination part 122*a*, and the variable name of the non-shared variable in the program B in machine language is replaced with the address.

[Implementation Example by Software]

The control block (particularly the identifier acquisition part 121*a*, the shared variable name generation part 121*b*, the conversion part 121*c*, the determination part 121*d*, the address determination part 122*a*, the program A management part 21*a*, and the program B management part 21*b*) of the compiler device 12 and the program management part 21 may be implemented by a logic circuit (hardware) formed in an integrated circuit (IC chip) or the like, or may be implemented by software.

In the latter case, the compiler device 12 and the program management part 21 include a computer executing instructions of a program, which is software that implements each function. The computer includes, for example, one or more processors and a computer-readable recording medium which stores the program. Then, in the computer, the processor reads the program from the recording medium and executes it to thereby achieve the objective of the disclosure. The processor may be, for example, a CPU (central processing unit). As the recording medium, a "non-transitory tangible medium" such as a ROM (read only memory), a tape, a disk, a card, a semiconductor memory, a programmable logic circuit, and the like may be used. Moreover, a RAM (random access memory) for developing the above program may be further provided. Further, the program may be supplied to the computer via any transmission medium (communication network, broadcast wave, etc.) capable of transmitting the program. It is noted that one aspect of the disclosure may also be implemented in the form of a data signal embedded in a carrier wave, in which the above program is embodied by electronic transmission.

SUMMARY

One aspect of the disclosure provides a compiler device. A shared variable referenceable from both a first user program and a second user program is defined in a source code of the first user program. The compiler device includes an identifier acquisition part, a shared variable name generation part, a conversion part, and an address determination part. The identifier acquisition part acquires an identifier of the first user program. The shared variable name generation part generates a shared variable name including the identifier and a variable name of the shared variable in the source code of the first user program. The conversion part converts the first user program into machine language. The address determination part determines an address of the shared variable. The address determination part associates the shared variable name and the address of the shared variable with each other and embeds them in the first user program which has been converted into machine language.

According to the above aspect, it is possible to prevent a conflict between variable names and unintentional overwriting of data when there are a plurality of programs which define a shared variable.

In one aspect of the disclosure, the address determination part replaces an instruction to access the shared variable in the first user program which has been converted into machine language, with an instruction to access the address of the shared variable.

According to the above aspect, the conversion part can replace the instruction to access the shared variable with a machine language instruction to access the address of the shared variable. In a program which defines a shared variable, by accessing the shared variable using an address, it is possible to access the shared variable at high speed.

In one aspect of the disclosure, the identifier acquisition part acquires the identifier from a configuration file.

According to the above aspect, the identifier acquisition part can acquire the identifier from a configuration file.

In one aspect of the disclosure, the identifier acquisition part acquires the identifier from the source code of the first user program.

According to the above aspect, the identifier acquisition part can acquire the identifier from the source code of the first user program.

In one aspect of the disclosure, the identifier acquisition part uses as the identifier an argument specified by a user at the time of execution of compiling.

According to the above aspect, the identifier acquisition part can use the argument as the identifier.

In one aspect of the disclosure, the identifier includes a path where the first user program is to be configured.

According to the above aspect, the identifier can include a path where the first user program is to be configured.

In one aspect of the disclosure, the identifier includes a file name of the first user program.

According to the above aspect, the identifier can include a file name of the first user program.

One aspect of the disclosure provides a compiling method. A shared variable referenceable from both a first user program and a second user program is defined in a source code of the first user program. The compiling method includes the following steps. An identifier of the first user program is acquired. A shared variable name including the identifier and a variable name of the shared variable in the source code of the first user program is generated. The first user program is converted into machine language. An address of the shared variable is determined. The shared variable name and the address of the shared variable are associated with each other and embedded in the first user program which has been converted into machine language.

One aspect of the disclosure provides a compiler device including a determination part, a conversion part, and an address determination part. The determination part determines whether a variable referenced in a source code of a second user program is a shared variable. The conversion part converts the second user program into machine language. In a case where the variable is not a shared variable, the address determination part replaces an instruction to access the variable with a machine language instruction to access an address of the variable without using an API (application program interface). In a case where the variable is a shared variable, the conversion part replaces an instruction to access the variable with a machine language instruction to access the variable via an API provided by a program management part which knows an address of the shared variable.

According to the above aspect, the second user program can be compiled and linked so that the second user program can access a shared variable defined by another first user program.

One aspect of the disclosure provides a compiling method including a determination process of determining whether a variable referenced in a source code of a second user program is a shared variable, and a conversion process of converting the second user program into machine language. In the conversion process, in a case where the variable is not a shared variable, an instruction to access the variable is replaced with a machine language instruction to access an address of the variable without using an API (application program interface), and in a case where the variable is a shared variable, an instruction to access the variable is replaced with a machine language instruction to access the variable via an API provided by a program management part which knows an address of the shared variable.

The disclosure is not limited to the above-described embodiments, and various modifications may be made within the scope of the claims. The technical scope of the disclosure also includes embodiments obtained by appropriately combining the technical means disclosed in the different embodiments.

What is claimed is:

1. A compiler device, wherein a shared variable referenceable from both a first user program and a second user program is defined in a source code of the first user program, the compiler device comprising:
    an identifier acquisition part acquiring an identifier of the first user program;
    a shared variable name generation part generating a shared variable name comprising the identifier and a variable name of the shared variable in the source code of the first user program;
    a conversion part converting the first user program into machine language; and
    an address determination part determining an address of the shared variable, wherein
    the address determination part associates the shared variable name and the address of the shared variable with each other and embeds them in the first user program which has been converted into machine language.

2. The compiler device according to claim 1, wherein the address determination part replaces an instruction to access the shared variable in the first user program which has been converted into machine language, with an instruction to access the address of the shared variable.

3. The compiler device according to claim 1, wherein the identifier acquisition part acquires the identifier from a configuration file.

4. The compiler device according to claim 1, wherein the identifier acquisition part acquires the identifier from the source code of the first user program.

5. The compiler device according to claim 1, wherein the identifier acquisition part uses as the identifier an argument specified by a user at the time of execution of compiling.

6. The compiler device according to claim 1, wherein the identifier comprises a path where the first user program is to be configured.

7. The compiler device according to claim 1, wherein the identifier comprises a file name of the first user program.

8. A compiling method, wherein a shared variable referenceable from both a first user program and a second user program is defined in a source code of the first user program, the compiling method comprising:
    acquiring an identifier of the first user program;
    generating a shared variable name comprising the identifier and a variable name of the shared variable in the source code of the first user program;
    converting the first user program into machine language;
    determining an address of the shared variable; and
    associating the shared variable name and the address of the shared variable with each other and embedding them in the first user program which has been converted into machine language.

9. A compiler device comprising:
a determination part determining whether a variable referenced in a source code of a second user program is a shared variable;
a conversion part converting the second user program into machine language; and
an address determination part, wherein
in a case where the variable is not a shared variable, the address determination part replaces an instruction to access the variable with a machine language instruction to access an address of the variable without using an API (application program interface), and
in a case where the variable is a shared variable, the conversion part replaces an instruction to access the variable with a machine language instruction to access the variable via an API provided by a program management part which knows an address of the shared variable.

10. A compiling method comprising:
a determination process of determining whether a variable referenced in a source code of a second user program is a shared variable; and
a conversion process of converting the second user program into machine language, wherein in the conversion process,
in a case where the variable is not a shared variable, an instruction to access the variable is replaced with a machine language instruction to access an address of the variable without using an API (application program interface), and
in a case where the variable is a shared variable, an instruction to access the variable is replaced with a machine language instruction to access the variable via an API provided by a program management part which knows an address of the shared variable.

* * * * *